(12) United States Patent
Darcy et al.

(10) Patent No.: US 12,479,163 B2
(45) Date of Patent: Nov. 25, 2025

(54) APPARATUS, SYSTEM, AND METHOD FOR BLOCKCHAIN TRACKING OF SPOOLED ADDITIVE MANUFACTURING PRINT MATERIAL

(71) Applicant: JABIL INC., St. Petersburg, FL (US)

(72) Inventors: Jonathan M. Darcy, St. Petersburg, FL (US); Luke Rodgers, St. Petersburg, FL (US); John Dulchinos, St. Petersburg, FL (US); Kyle Cheung, St. Petersburg, FL (US); Brian Yates, St. Petersburg, FL (US)

(73) Assignee: JABIL INC.

( * ) Notice: Subject to any disclaimer, the term of this patent is extended or adjusted under 35 U.S.C. 154(b) by 505 days.

(21) Appl. No.: 17/499,632

(22) Filed: Oct. 12, 2021

(65) Prior Publication Data

US 2022/0088882 A1    Mar. 24, 2022

Related U.S. Application Data

(63) Continuation-in-part of application No. PCT/US2021/051553, filed on Sep. 22, 2021.

(Continued)

(51) Int. Cl.
*B29C 64/393*    (2017.01)
*B29C 64/321*    (2017.01)
(Continued)

(52) U.S. Cl.
CPC .......... *B29C 64/393* (2017.08); *B29C 64/321* (2017.08); *B33Y 30/00* (2014.12);
(Continued)

(58) Field of Classification Search
CPC ..... B29C 64/386; B29C 64/393; B33Y 50/00; B33Y 50/02
See application file for complete search history.

(56) References Cited

U.S. PATENT DOCUMENTS 7,520,740 B2    4/2009    Wahlstrom
10,732,610 B2   8/2020    Dohi
(Continued)

FOREIGN PATENT DOCUMENTS

CN    108883580 A    11/2018
CN    110891786 B     8/2022
(Continued)

OTHER PUBLICATIONS

Extended European Search Report issued in App. No. EP21873353, dated Feb. 1, 2024, 9 pages.
(Continued)

*Primary Examiner* — Andrew L Swanson
(74) *Attorney, Agent, or Firm* — Riverside Law LLP

(57) ABSTRACT

Apparatuses, systems and methods to track use of print filament wound on a print spool on a printer in an additive manufacturing print. Included are: a readable identifier associated with the print spool; a network connection between the at least one printer and at least one network ledger, the network ledger comprising the readable identifier and a corresponding verification of the readable identifier and, solely for verified ones of the readable identifier, an in-ledger link to a data store comprising a plurality of parameters for the 3D print filament, records of prior ones of the plurality of additive manufacturing prints using the 3D print filament, and enhanced print algorithms for the 3D print filament; a confirmation data block at the data store of a sufficient amount of the print filament on the print spool to execute a plan for a current one of the plurality of manufacturing prints; a controller for executing the current one of the plurality of manufacturing prints, including sufficient ones of the plurality of parameters for the current print and ones of the enhanced print algorithms for the current print, in accordance with the confirmation data block; and an (Continued)

update block generator for generating an update block to the ledger confirming at least execution of the current one of the plurality of manufacturing prints by the at least one printer, and an update to the confirmation data block of the enhanced print algorithms and the amount of the print filament used in correspondence to the readable identifier.

13 Claims, 5 Drawing Sheets

Related U.S. Application Data

(60) Provisional application No. 63/081,527, filed on Sep. 22, 2020.

(51) Int. Cl.
- *B33Y 30/00* (2015.01)
- *B33Y 50/02* (2015.01)
- *G06K 19/06* (2006.01)
- *H04L 9/32* (2006.01)
- *B29C 64/118* (2017.01)
- *H04L 9/00* (2022.01)

(52) U.S. Cl.
CPC .............. *B33Y 50/02* (2014.12); *G06K 19/06* (2013.01); *H04L 9/3236* (2013.01); *B29C 64/118* (2017.08); *H04L 9/50* (2022.05)

(56) References Cited

U.S. PATENT DOCUMENTS

| | | |
|---|---|---|
| 11,023,608 B2 | 6/2021 | Adkins |
| 11,789,672 B2 | 10/2023 | Wegner |
| 2011/0121476 A1 | 5/2011 | Batchelder |
| 2014/0117585 A1 | 5/2014 | Douglas |
| 2014/0214684 A1 | 7/2014 | Pell |
| 2016/0098723 A1 | 4/2016 | Feeney |
| 2017/0261965 A1* | 9/2017 | Shiihara ............ G05B 19/4099 |
| 2018/0001565 A1 | 1/2018 | Hocker |
| 2018/0012311 A1 | 1/2018 | Small |
| 2018/0173203 A1* | 6/2018 | Freer ...................... G06F 21/44 |
| 2018/0304540 A1* | 10/2018 | Tobia ...................... B22F 10/31 |
| 2019/0340269 A1 | 11/2019 | Biernat |
| 2020/0175508 A1 | 6/2020 | Yamakado |
| 2020/0201294 A1 | 6/2020 | Nelson |
| 2020/0233398 A1 | 7/2020 | Freer |
| 2020/0258031 A1* | 8/2020 | Makhija ................. G06N 20/00 |
| 2020/0324481 A1 | 10/2020 | Sayers |
| 2021/0271229 A1 | 9/2021 | Molcho |
| 2021/0342957 A1 | 11/2021 | Small |
| 2022/0121173 A1 | 4/2022 | Pelage |
| 2022/0366358 A1 | 11/2022 | Perez |

FOREIGN PATENT DOCUMENTS

| | | |
|---|---|---|
| CN | 110244915 B | 9/2022 |
| EP | 3226165 B1 | 4/2019 |
| JP | 2017094509 | 6/2017 |
| JP | 7133018 B2 | 9/2022 |
| KR | 20090105088 A | 10/2009 |
| WO | 2018069736 A1 | 4/2018 |
| WO | 2020259820 A1 | 12/2020 |

OTHER PUBLICATIONS

Japanese Office Action issued in App. No. JP2023-518384, dated Mar. 19, 2024, 3 pages.
International Search Report for PCT/US2021/051553, dated Jan. 13, 2022.
Written Opinion of the International Searching Authority for PCT/US2021/051553, dated Jan. 13, 2022.

* cited by examiner

APPARATUS, SYSTEM, AND METHOD FOR BLOCKCHAIN TRACKING OF SPOOLED ADDITIVE MANUFACTURING PRINT MATERIAL

CROSS REFERENCE TO RELATED APPLICATION

The present application is a Continuation-In-Part application of International Application No. PCT/US2021/051553, filed Sep. 22, 2021, entitled: APPARATUS, SYSTEM AND METHOD FOR BLOCKCHAIN TRACKING OF SPOOLED ADDITIVE MANUFACTURING PRINT MATERIAL, which claims priority to Provisional Application No. 63/081,527, filed Sep. 22, 2020, entitled: APPARATUS, SYSTEM AND METHOD FOR BLOCKCHAIN TRACKING OF SPOOLED ADDITIVE MANUFACTURING PRINT MATERIAL, the contents of which is incorporated by reference in its entirety herein.

BACKGROUND

Field of the Disclosure

Embodiments disclosed herein relate to additive manufacturing, and, more particularly, to blockchain tracking of spooled additive manufacturing print material.

Description of the Background

In the 3D printing art, such as fused filament fabrication (FFF) or fused deposition modeling (FDM), for example, a feed material (commonly a polymer) is liquefied or partially liquefied in a hot end of an additive manufacturing nozzle. The nozzle is then moved around a build surface in the x and y axes directions, to build layers in the z axis to form the print build. That is, as the nozzle moves about in the x and y directions (i.e., parallel to the build surface) pursuant to an electronic print plan uploaded to the printer, the liquefied feed material is deposited and solidifies upon a reduction in temperature of the build. Each finite amount of deposited liquid material is typically held together with the previous finite amount of deposited liquid material by physical entanglement. This is possible because the previously deposited material and the newly deposited material are both in the liquid or softened state when the surface area of the two deposited layers meet.

Note that different additive manufacturing platforms might have different item creation capabilities, and that these capabilities may depend, in part, on the print filament or print material used. Moreover, the different item creation capabilities might require or benefit from different item definition files and/or different engineering models, i.e., from different print algorithms and variables, some of which may be proprietary and which also may depend upon the type of print filament or material provided.

Thus, it is often the case that characteristics of the print material, such as a print filament, must be known to the electronic print plan such that the proper printing capabilities and/or algorithms are used with the proper print filament. However, in the current state of the art, any identification of a print filament is performed by placing an identification on the spool that holds the print filament. Such identification on the spool may include, by way of example, a radio frequency identification ("RFID") tag, a bar code, or a QR code. However, this identification of the spool does nothing to insure that the print filament on the spool actually has the characteristics it is purported to have. For example, filament may be respooled after the initially spooled filament is exhausted, without change to the initial spool identification.

A blockchain is a growing list of records, referred to as "blocks", that are linked together using cryptographic techniques. Each block contains a cryptographic hash of the previous block, a timestamp, and data regarding the transaction represented by the block. Blocks thus hold batches of valid transactions that are hashed and encoded, and which are placed together consecutively in a chain.

Due, in part, to the foregoing series of characteristics, a blockchain is resistant to modification of the data represented. More specifically, blockchain is an open, distributed ledger that can record transactions between two parties efficiently and in a verifiable, highly secure and permanent way.

As a distributed ledger, a blockchain is typically managed by a peer-to-peer network collectively adhering to a protocol for inter-node communication and validation of new blocks. By storing data across its peer-to-peer network, the blockchain eliminates a number of risks that come with data being held centrally. For example, once recorded, the data in any given block cannot be altered retroactively without alteration of all subsequent blocks, which requires consensus of the peer network. Decentralized consensus is therefore provided by blockchain.

The decentralization of blockchain allows the participants to verify and audit transactions independently and relatively inexpensively. The use of a blockchain can remove the characteristic of infinite reproducibility from either a digital asset, or an actual asset represented by the data in the blockchain. Blockchain can confirm that each unit of value was transferred only once, solving the long-standing problem of double spending.

Blockchain security methods include the use of public-key or public/private-key cryptography. The public key is an address on the blockchain. The private key may be a password that gives its owner access to their particular digital assets or capabilities on the blockchain. Because of the cryptography and the decentralization of control, data stored on the blockchain is thus generally considered incorruptible.

Typical uses for blockchain at present include, but are not limited to: bitcoin and other cryptocurrencies; financial and business transactions; and supply chain for product manufacturing. Of course, new uses for blockchain are being constantly developed.

It would therefore be desirable to provide systems and methods to better track the use and propriety of additive manufacturing print materials using a secure and highly reliable tracking method that is substantially incorruptible.

SUMMARY

The disclosed exemplary apparatuses, systems and methods to track use of a 3D print filament wound on a print spool on at least one printer in a plurality of additive manufacturing prints. The apparatus, system, and method may include: a readable identifier associated with the print spool; a network connection between the at least one printer and at least one network ledger, the network ledger comprising the readable identifier and a corresponding verification of the readable identifier and, solely for verified ones of the readable identifier, an in-ledger link to a data store comprising a plurality of parameters for the 3D print filament, records of prior ones of the plurality of additive manufacturing prints using the 3D print filament, and enhanced print algorithms for the 3D print filament; a confirmation data block at the data store of a sufficient amount of the print filament on the print spool to execute a plan for a current one of the plurality of manufacturing prints; a controller for executing the current one of the plurality of manufacturing prints, including sufficient ones of the plurality of parameters for the current print and ones of the enhanced print algorithms for the current print, in accordance with the confirmation data block; and an update block generator for generating an update block to the ledger confirming at least execution of the current one of the plurality of manufacturing prints by the at least one printer, and an update to the confirmation data block of the enhanced print algorithms and the amount of the print filament used in correspondence to the readable identifier.

Therefore, the embodiments provide systems and methods to better track the use and propriety of additive manufacturing print materials using a secure and highly reliable tracking method that is substantially incorruptible.

BRIEF DESCRIPTION OF THE DRAWINGS

The disclosure is provided by the text herein, as well as the accompanying drawings, in which like numerals may represent like elements, and wherein.

DETAILED DESCRIPTION

Figure 1:
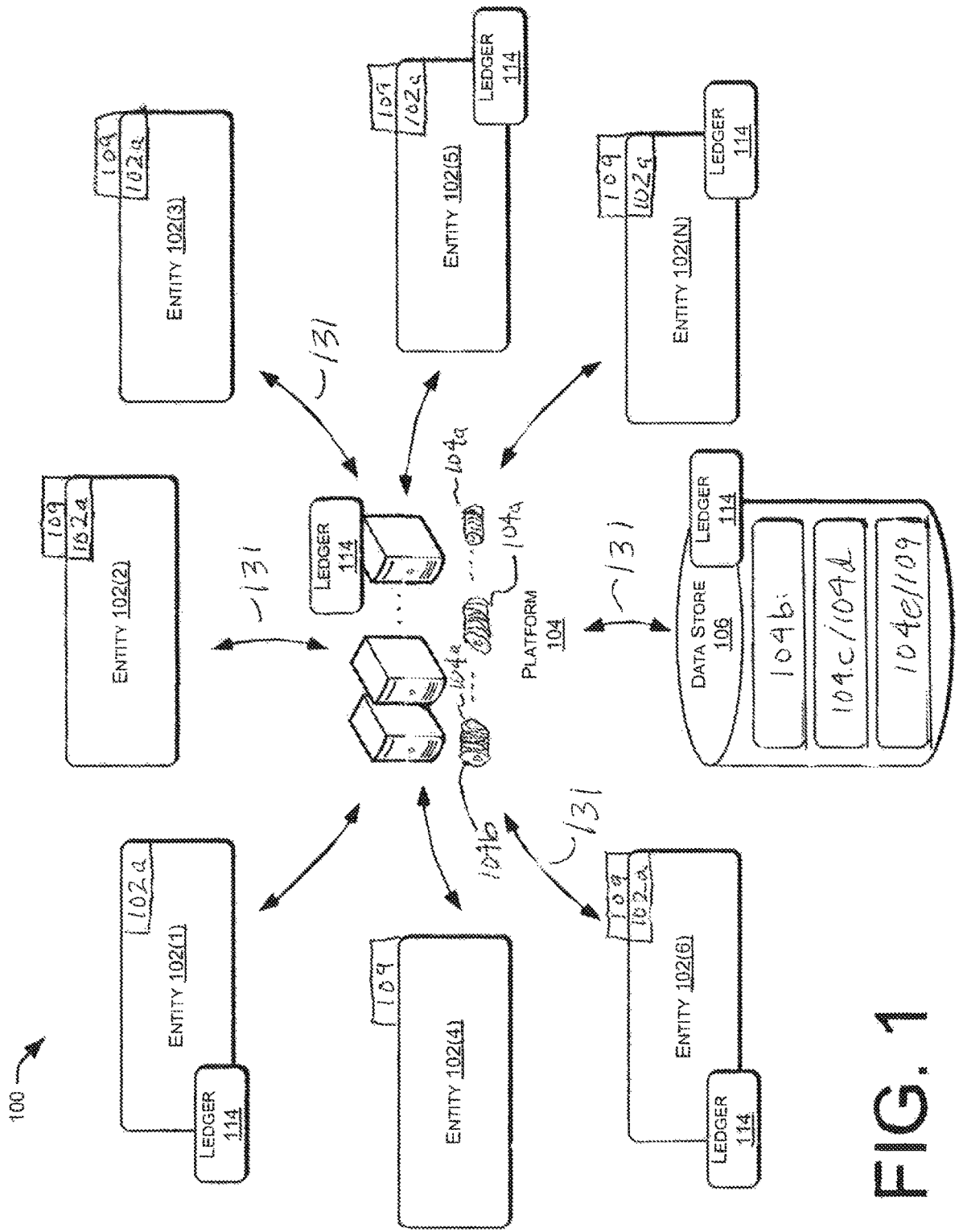
FIG. 1 is a high-level block diagram of a system according to embodiments.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the exemplary embodiments.

Processor-implemented modules and print systems are disclosed herein that may provide access to and transformation of a plurality of types of digital content, including but not limited to print plans and data streams, and the algorithms applied herein may track, deliver, manipulate, transform, transceive and report the accessed content. Described embodiments of these modules, apps, systems and methods are intended to be exemplary and not limiting.

An exemplary computing processing system for use in association with the embodiments, by way of non-limiting example, is capable of executing software, such as an operating system (OS), applications/apps, user interfaces, and/or one or more other computing algorithms, such as the print recipes, algorithms, decisions, models, programs and subprograms discussed herein. The operation of the exemplary processing system is controlled primarily by non-transitory computer readable instructions/code, such as instructions stored in a computer readable storage medium, such as hard disk drive (HDD), optical disk, solid state drive, or the like. Such instructions may be executed within the central processing unit (CPU) to cause the system to perform the disclosed operations. In many known computer servers, workstations, mobile devices, personal computers, and the like, CPU is implemented in an integrated circuit called a processor.

It is appreciated that, although the exemplary processing system may comprise a single CPU, such description is merely illustrative, as the processing system may comprise a plurality of CPUs. As such, the disclosed system may exploit the resources of remote CPUs through a communications network or some other data communications means.

In operation, CPU fetches, decodes, and executes instructions from a computer readable storage medium. Such instructions may be included in software. Information, such as computer instructions and other computer readable data, is transferred between components of the system via the system's main data-transfer path.

In addition, the processing system may contain a peripheral communications controller and bus, which is responsible for communicating instructions from CPU to, and/or receiving data from, peripherals, such as 3D printers and/or the operator interaction elements to formulate a print, as discussed herein throughout. An example of a peripheral bus is the Peripheral Component Interconnect (PCI) bus that is well known in the pertinent art.

An operator display/graphical user interface (GUI) may be used to display visual output and/or presentation data generated by or at the request of processing system, such as responsive to operation of the aforementioned computing programs/applications. Such visual output may include text, graphics, animated graphics, and/or video, for example.

Further, the processing system may contain a network adapter which may be used to couple to an external communication network, which may include or provide access to the Internet, an intranet, an extranet, or the like. Communications network may provide access for processing system with means of communicating and transferring software and information electronically. Network adaptor may communicate to and from the network using any available wired or wireless technologies. Such technologies may include, by way of non-limiting example, cellular, Wi-Fi, Bluetooth, infrared, or the like.

The disclosure is and is directed to an apparatus, system and method to track use of a 3D print filament wound on a print spool for at least one printer in a plurality of additive manufacturing prints. Included in the embodiments are: a readable identifier associated with the print spool; and a network connection between the at least one printer and at least one network ledger, the network ledger comprising the readable identifier and a corresponding verification of the readable identifier for use with a particular one of the printer. Further, for verified ones of the readable identifier, the blockchain ledger includes an in-ledger link to a data store comprising a plurality of parameters for the 3D print filament, records of prior ones of the plurality of additive manufacturing prints using the 3D print filament, and enhanced print algorithms for the 3D print filament.

A confirmation data block is included at the data store. This confirmation block includes the foregoing information as well as a confirmation that there is a sufficient amount of the print filament on the print spool to execute a plan for a current one of the plurality of manufacturing prints. Also included is a controller for executing the current one of the plurality of manufacturing prints. The controller verifies that the ones of the plurality of parameters are sufficient for the current print, and that the needed ones of the enhanced print algorithms are available for the current print, in accordance with the confirmation data block. An update block generator then generates an update block to the ledger confirming at least verification of the spool and execution of the current one of the plurality of manufacturing prints by the at least one printer. The update block generator may also update the confirmation data block of the enhanced print algorithms and the amount of the print filament used in correspondence to the readable identifier.

More particularly, FIG. 1 is a schematic diagram illustrating an example system 100 usable to implement the aspects described herein. As shown in FIG. 1, the system 100 includes multiple entities 102(1), 102(2), 102(3), 102(4), 102(5), 102(6), . . . 102(N) (collectively referred to herein as entities 102) which are in communication with an additive manufacturing print material generating platform 104 (sometimes referred to simply as "the platform 104") and a data store 106 that is at least partially associated with a blockchain ledger 114, such as via one or more wired and/or wireless networks. By way of example and not limitation, the networks may comprise cable networks (e.g., cable television and/or internet networks), telephone networks (e.g., wired and/or cellular), satellite networks (e.g., satellite television networks), local area networks (e.g., Ethernet, wifi, Bluetooth, Zigbee, etc.), fiber optic networks, or any other network or networks capable of transmitting data between and among the entities 102, the platform 104, and/or the data store 106. The network(s) 131 may be or include a collection of individual networks interconnected with each other and functioning as a single large network (e.g., the Internet or an intranet).

The entities 102 in this example are representative of parties that use and/or provide products or services based upon the print material 104a generated from platform 104. By way of example and not limitation, each of the entities 102 may represent one or more designers, customers, printer owners, printer manufacturers, computer aided design (CAD) software companies, traditional manufacturers, shippers, post processing service providers, finishing service providers, assemblers, bricks and mortar merchants, fulfillment companies, or the like. Each entity 102 may fit a single role (e.g., customer) or multiple roles (e.g., a printer owner who also provides post processing, finishing, and assembly services). Each entity 102 in this example includes at least one computing device 102a on site, including one or more processors, memory, and one or more communication connections by which the computing device(s) of the respective entity may communicate over the network. These computing devices 102a are capable of printing from an electronic print plan, wherein this print plan may take into account print capabilities indicated by the print material and the on-site printer 102a. Moreover, this print plan may include an indication of the build that is executed therefrom. The on-site computer 102a may form part of the printer on-site, or may be communicatively associated with the on-site printer.

The data store 106 represents network accessible storage usable to store various data and information, such as may form part of one or more blocks in ledger 114, and/or such as may be linked through one or more blocks in ledger 114. By way of example and not limitation, the data store 106 may comprise a data store specific to the print material 104a, such as type, generator 104, uses, licenses, or particular characteristics, by way of non-limiting example; identification of the spool 104b associated therewith; any proprietary algorithms or variables associated with that print material on that spool (such as may be uniquely tied to printers having certain characteristics) 104c; a repository of product designs/models executed using that print material 104d; times and locations of prior builds using that print material; product specifications 104e; part or item models; packaging models; or combinations thereof. While only one data store 106 is shown in FIG. 1, in practice any number of one or more data stores may be included in the system 100 and/or accessible to the platform 104 and to the ledger 114.

In some examples, product specifications may include a description of features, characteristics, and requirements of a product that a customer desires to have designed and/or manufactured. In some examples, product specifications may additionally or alternatively include engineering drawings, renderings, sketches, blue prints, material specifications, material or print parameters, or other information related to the design and/or manufacture of the product.

In the illustrated example, one or more distributed ledgers 114, i.e., blockchains, may be used to record various transactions, execute smart contracts, and/or perform other operations conducted in relation to the print material 104*a* on spool 104*b*, as discussed throughout. While a single common ledger 114 is shown in this example for simplicity, in some examples multiple different ledgers may be used in connection with the print material 104. For example, different ledgers may be used for different industries (e.g., an automotive ledger, a medical device ledger, a consumer products ledger, or a military ledger, etc.), different ledgers may be used for different licensees, different ledgers may be used for different roles (e.g., a customer ledger or a manufacturer ledger), and/or different ledgers may be used for different authorizations. Likewise, ledger 114 may simplistically include only authorized and unauthorized transactions, and subsequent linking to parameters in an external data store 106 for only authorized transactions, i.e., only for verified spools/print material. The ledger 114 may be public key or public/private key. By way of example, the ledger 114 may be publicly accessible and may comprise a common public ledger of blockchained transactions performed by entities 102 using print material(s) 104*a*.

In a simplified example, data store 106 may include a print filament associated with an identifier of a print spool; a time, place, and amount of filament used for a given print build; the print plan for the print build; and a key to unlock certain capabilities of particular printers in which that particular filament is used. The printer 109 to be used to execute the print plan on behalf of an entity, and whether that printer 109 is authorized to use, and/or did use, the uniquely available capabilities indicated by proprietary algorithms, may also be stored to data store 106. The data store 106 for that filament, and for that particular use of that particular filament, may simply link to the blockchain ledger 114 to. The blockchain ledger 114 may then include a simple binary check whether the spool is verified/authorized or not and, if authorized, may link the spool to the data store 106 and update an additional "authorized use" to the blockchain ledger 114 in relation to that filament/spool. If the spool is authorized, operational aspects related to the spooled material may proceed, and these aspects may or may not be part of, or linked to, the block ledger 114.

Figure 2:
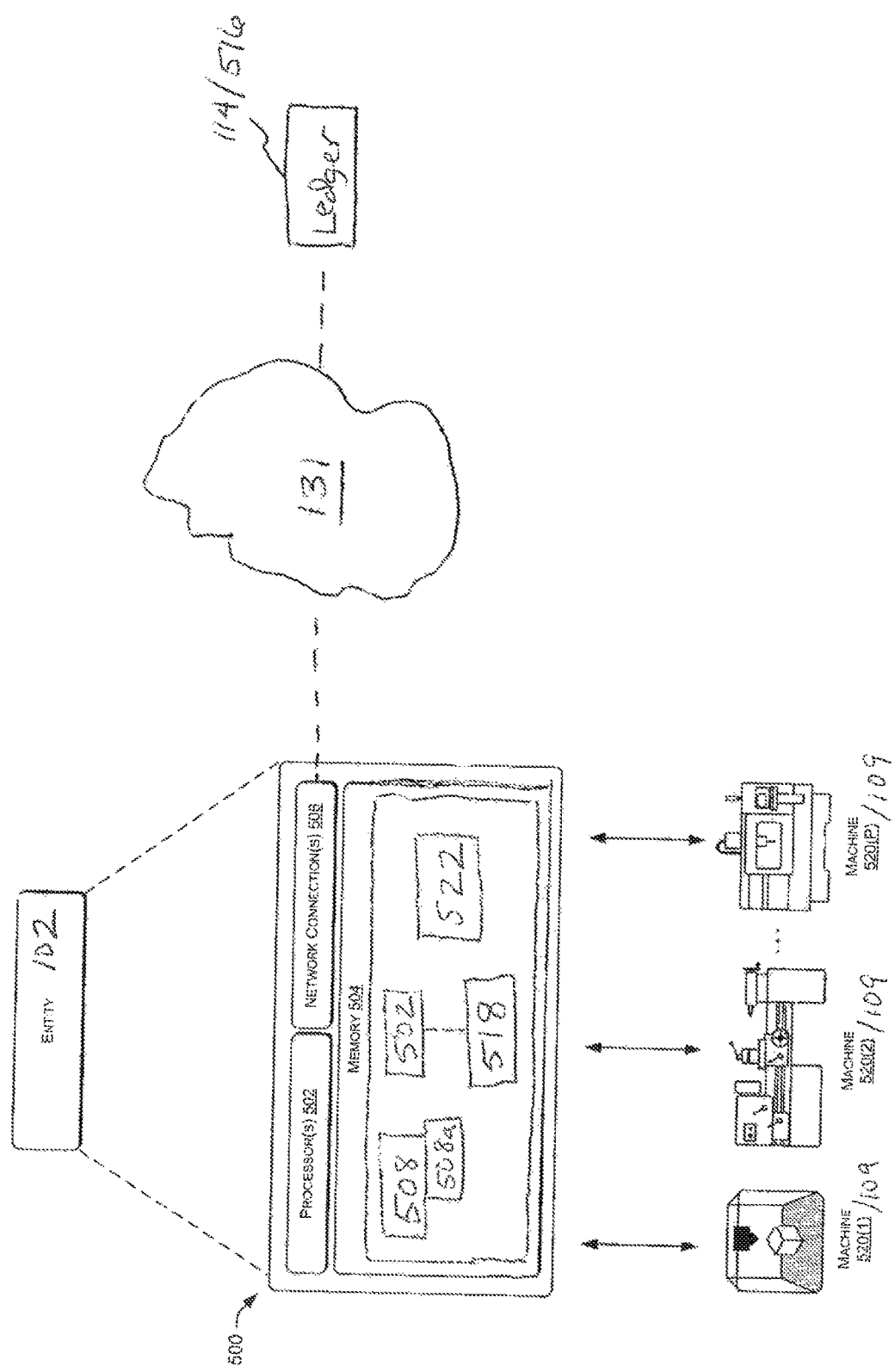
FIG. 2 is a block diagram of an entity interacting with the blockchain ledger.

FIG. 2 is a schematic diagram illustrating an example computing device 500 of an entity 102 of FIG. 1 (which may be included in printer 109 of FIG. 1, or which may be communicatively associated with printer 109), such as an additive manufacturer. The computing device operates in communication with the decentralized blockchain ledger 114 shown in FIG. 1. The computing device 500 comprises one or more processors 502, memory 504, and network connections 506.

The memory 504 stores one or more applications 508 and proprietary print algorithms 508*a*. The network connections 506 may enable one or more communication protocols for peer-to-peer file sharing ("P2P") and logic and interfaces usable to distribute data and electronic files over the network to one or more other entities 102. The applications 508 may also implement a data store 106 and/or a distributed data store 106. The applications 508 may be configured to write to a distributed ledger 516. The proprietary algorithms 508*a* may be made available to the applications 508, and more particularly the print characteristics of the applications 508, only upon one or more verifications made based upon the existing data store in ledger 516, as discussed throughout.

The computing device 500 may include one or more controllers 518 configured to control one or more 3D printers 520(1), 520(2), . . . 520(P), where P is any integer greater than or equal to 1. The printer 520 may include any type of additive manufacturing printer, but may, in alternative embodiments, be other types of machine that may apply proprietary algorithms to finite manufacturing materials, including, without limitation, machines for molding (e.g., injection molding, blow molding, etc.), casting (e.g., sand casting, etc.), forming (e.g., shearing, stamping, punching, etc.), joining (e.g., welding, brazing, soldering, etc.), finishing (e.g., deburring, sanding, polishing, knurling, sand blasting, etc.), post processing (e.g., annealing, quenching, cryogenically freezing, painting, powder coating, plating, etc.), classical printing (i.e., ink jet printing, laser printing, etc.), and the like.

The computing device 500 may execute from memory 506 one or more print/build plans 522. The veracity of the print material may be updated to and by the ledger 516, the print/build plan 522 may be updated to the blockchain ledger 516 (or to the data store 106 linked to the ledger 516) if the print material is authorized, and the sufficiency of remaining print material to execute the print plan 522 may be confirmed to either or both of the ledger 516 and the data store 106, such as by analysis of the ledger 516 or its linked data store 106 by controller 518. The print plan 522 may then be executed by printer 520 in accordance with print application 508, which may (or may not) have access to particular algorithm(s) 508*a* in executing the print plan 522, such as based on the analysis of prior print data 104*d*/104*e*. Thereafter, the amount of print material used, the time/place of print, the printer type, the entity, the use of proprietary algorithms, and one or more aspects of the print plan 522, veracity of the filament, and/or use of the filament may be updated to the blockchain ledger 516.

Figure 3:
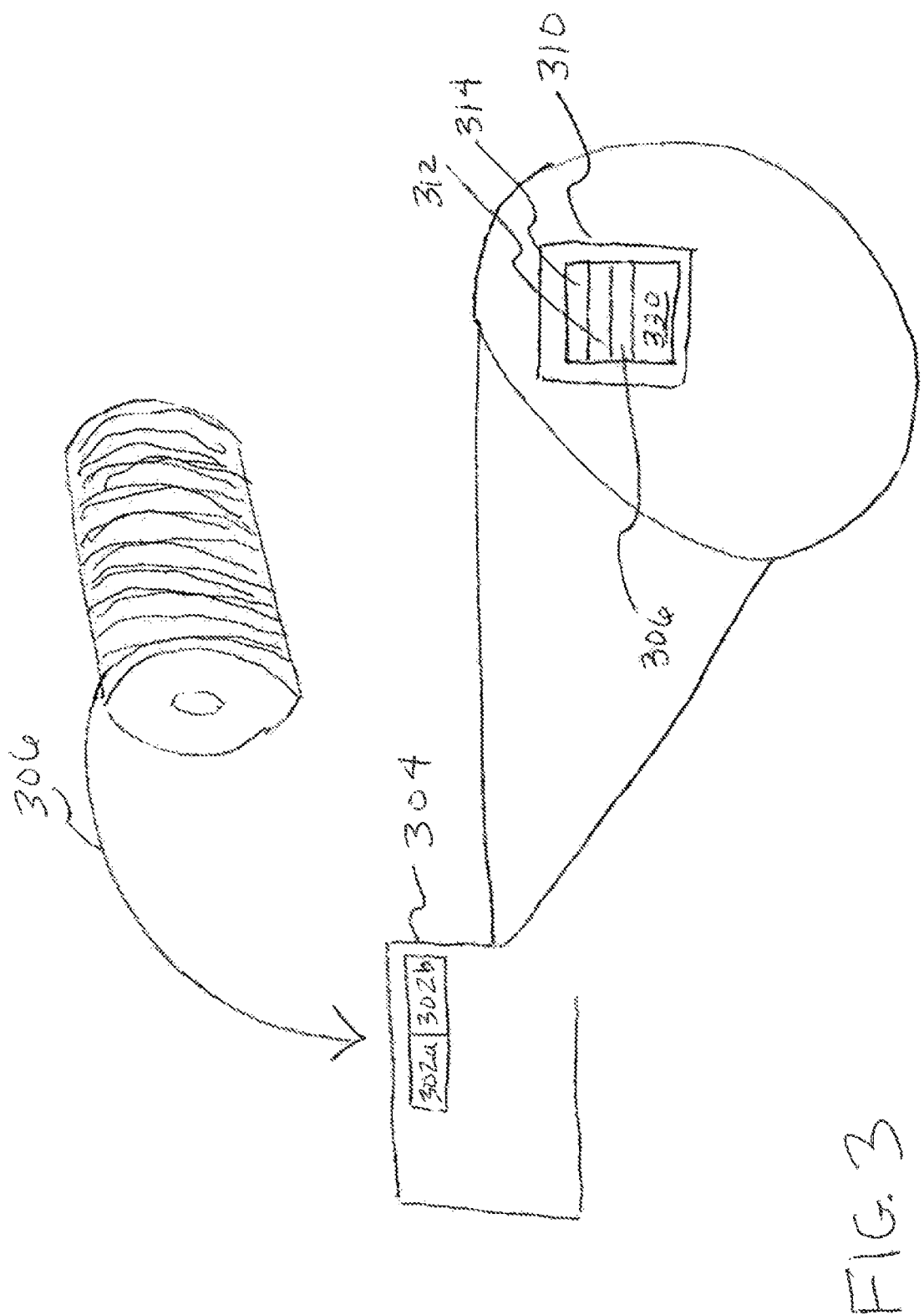
FIG. 3 is a schematic diagram of certain embodiments.

As will be appreciated by the skilled artist, various different grades, types, compositions, and the like, of spooled filament is available for 3D printing. As illustrated in FIG. 3, it is typical that, either by automated sensing or manual data entry 302*a*, *b*, the printer 304 discussed throughout (109/502) is aware of the general characteristics of a filament 306 fed into the printer's print head, such as by filament type, composition, size, and so on.

Additionally, it will be appreciated that a 3D print may be made of a variety of substantially two-dimensional layers, wherein each layer is printed upon the previous letter in the Z-axis, and each layer is printed via movement of the print head, and the X-Y axis. Moreover, the speed at which the print head moves is dependent upon changes in temperature of the heated filament; that is, in order to allow for faster print speeds, the temperature of the filament may be hotter so that the filament flows better to enable the necessary refinements of the print. Accordingly, it is often the case that a 3D print plan 310, when fed to a printer, constitutes a series of X-Y movements 312 and a temperature 314 for each two-dimensional layer, turn, angle, speed change, etc., of a print 310. However, as referenced above, the print file 310 additionally uses information regarding the filament 306 to assess the ability of the printer to maintain certain temperatures, make certain movements, print certain details, and the like as indicated by the print file 310.

Accordingly, the embodiments may include not only a material 306 having a certain type, composition, and the like, but a unique matching of each print spool material 306 with algorithms and available variables 330 for that print material. Thereafter, the providing of this print material 306 to a proprietary printer 304 that understands the aforesaid algorithms and variables 330 matched to that print material 306 may allow for enhanced capabilities for that printer 304 to print according to the print plan 310 with that print material 306. By way of example, an authorized proprietary filament 306 placed into a proprietary printer 304 having "knowledge" of the unique proprietary algorithms 330 for that specific filament 306 may run faster than that filament may be run in other printers, at least because an indication of the proprietary filament allows for knowledge on the part of the proprietary printer of the maximum capabilities, as evidenced in the algorithms 330, which that specific printer may perform when matched with that filament.

It is generally unlikely that the necessary identification of a material to allow for matching of that material with proprietary algorithms and variables can be assigned directly on the material. Rather, it would be typical that the material on a print spool would be identified by identifying aspects associated with the print spool, rather than the print material itself. In the known art, simple identification of print spools has limited usefulness, at least because there is no manner in which re-spooling of different material onto a previously identified print spool can be avoided. Thus, the use and the known art of RFID, bar codes, QR codes, and the like, to identify a print spool, and to thereby identify the material associated with the print spool, has very limited applicability.

Figure 4:
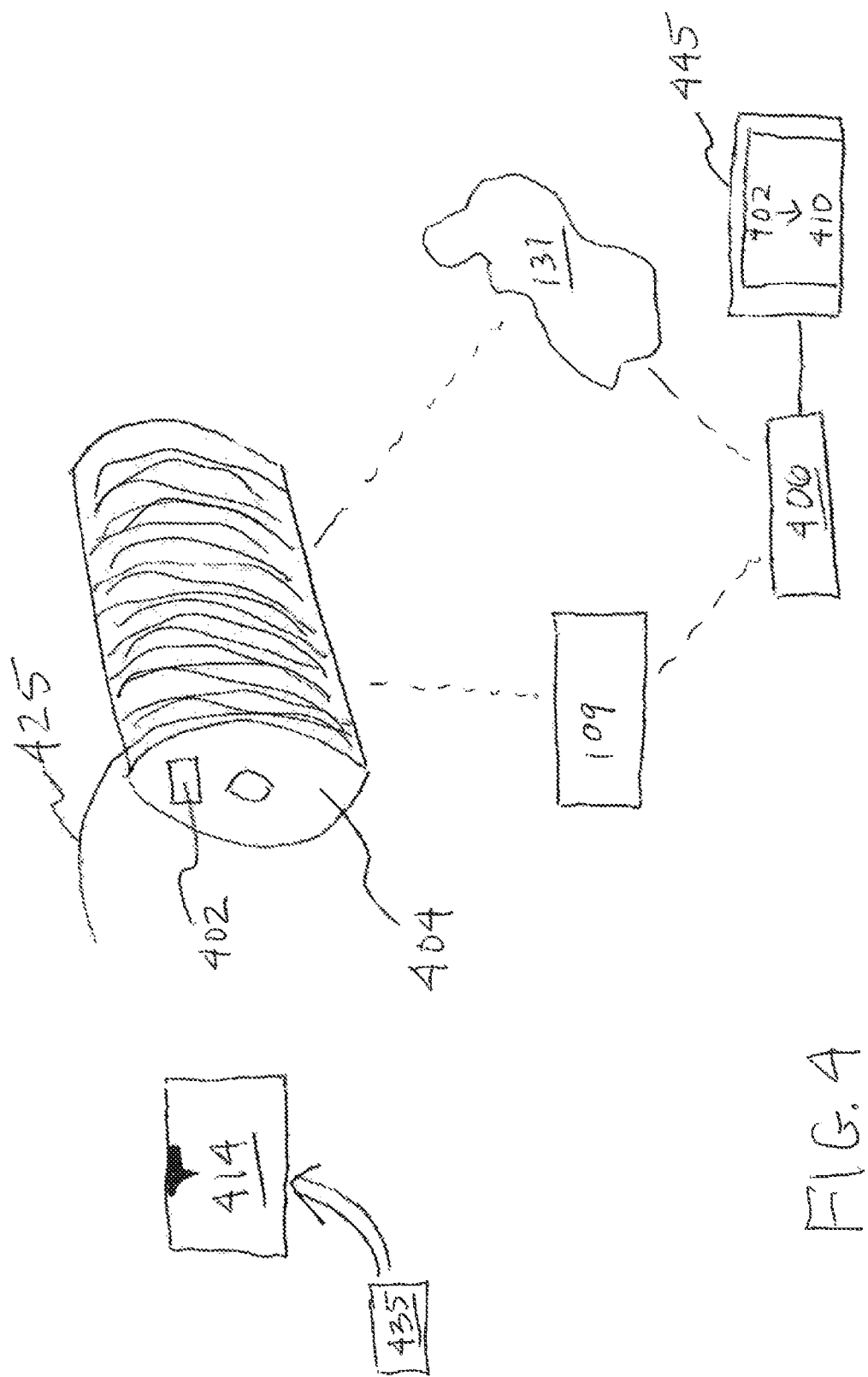
FIG. 4 illustrates a diagram of embodiments.

To remedy the foregoing drawbacks of the known art, the embodiments may include the herein discussed block chain validation of not only the print spool, but may additionally include, either in the blockchain ledger or in the data store linked to the ledger, the prior uses of the print spool, and hence of the filament thereon, as well, as illustrated in FIG. 4. That is, at least the identification/verification 402 of the print spool 404 may be associated with the re-writable block chain 406. Moreover, the identification 402 may be associated in the blockchain 406 (114/516), either in the ledger or in a link embedded in authorized blocks in the ledger, with a variety of algorithms/variables 410 that may enhance print capabilities for authorized prints and/or printers, such as is discussed throughout.

When the print spool 404 is thereafter associated with a printer 414, the printer reads the print spool 404, validates the prior uses of that spool 404 based on its identification 402 as evidenced by data 445 in or linked within the block chain 406, identifies whether any acceptable filament 425 is remaining on the print spool based on the prior uses, and, if so, unlocks any available algorithms and variables 410 associated with that remaining print filament 425, runs the print file 435 associated with the upcoming print, and then updates the re-writable block chain 406 to identify the amount of the print material 425 that has been used from the identified print spool.

As such, the spool will "expire", as indicated by the re-writable block chain tracking of that spool, either after a given timeframe or upon use of all print material associated with the spool. For example, the initial identification to the re-writable block chain may certify that 25 kg of material is associated with the print spool. As such, based on the reading, validation, and unlocking set forth above, once the 25 kg is updated as fully used, the block chain will expire that spool, and thus the identification associated with that spool, such that the spool may not be reused—in short, filament cannot be re-spooled onto the spool in order to obtain access to the desired algorithms and variables that are associated with the proprietary meeting of the print filament to the proprietary printer. Moreover, because of the use of the private-public key encryption, wherein the print machine holds the public, key, when the pool expires, the certification of the material also expires. Accordingly, the printer running said print plan will stop providing the enhanced capabilities, such as running at higher speed, until a proprietary print spool made it to the proprietary printer is used to replace the expired print spool.

As such, no use may be made to obtain the enhanced printing capabilities of counterfeit or re-spooled print filament. This is the case because such counterfeit or re-spooled print filament will be associated with a spool that either lacks proper block chain identification, or that is associated with an expired block chain identifier.

Yet further and in accordance with alternative ones of the embodiments, a re-writable memory may be associated directly with the spool, such as to serve, in part, as the identifier 402. Thereby, the identification of the spool, and or the block chain associated therewith, may be erased and rewritten, such as based on return of an empty spool and re-spooling of filament onto that spool by an authorized party.

It goes without saying that the disclosed block chain tracking may not only provide information on the use of a certain amount of filament in each print case. Rather, the block chain may include all history of the print material associated with the spool, such as including what was printed, a print plan employed, a location of the print, a time of the print, a controlling party of the print, the algorithms and variables employed during the print, enhance print capabilities used during the print, and so on.

Therefore, print processes may be drastically improved through the use of the embodiments. For example, writing errors, including those in which the print filament is mismatched to the print plan or the printer, are minimized. Additionally, the embodiments provide traceability of printing errors. Yet further, the use of miss graded or under graded print filaments for particular prints is avoided—for example, the nonuse of medical graded print materials in a medical device print will be evident from the block chain history usage of that print spool. In short, highly substantial data analysis for all print material on all print spools may be afforded by the embodiments, at least because the block chain usage of all filaments and all print spools on all prints will be evident in the re-writable block chain provided in the embodiments.

It will also be evident to the skilled artisan that certain commercial aspects are greatly improved through the use of the embodiments. For example, a license to use print material for certain prints, or certain purposes, or in certain printers need not be subjected to a licensing audit. That is, a certification may be provided for the use of 50 kg of print, material, and the block chain will not support certification of the print algorithms, variables, enhanced capabilities, or material beyond that certification.

Such commercial improvements are provided because of the self-validating nature of the re-writable block chain associated with and identifiable print spool. That is, licenses, royalty base systems, time based licenses, and the like may be certified using the system provided in the embodiments, without the need to audit usage at any place or any time.

Of note, the embodiments may use a validating computer instead of or in addition to the printer, and the printer may communicate with such a computer via wireless networking, remote networking, or the like, as will be appreciated by the skilled artisan. Additionally, and alternatively, various of the functionality discussed throughout may be present in a re-writable memory associated with the spool, based on algorithms stored within the printer, or comparison to known information on a validating computer stationed either locally or remotely.

Figure 5:
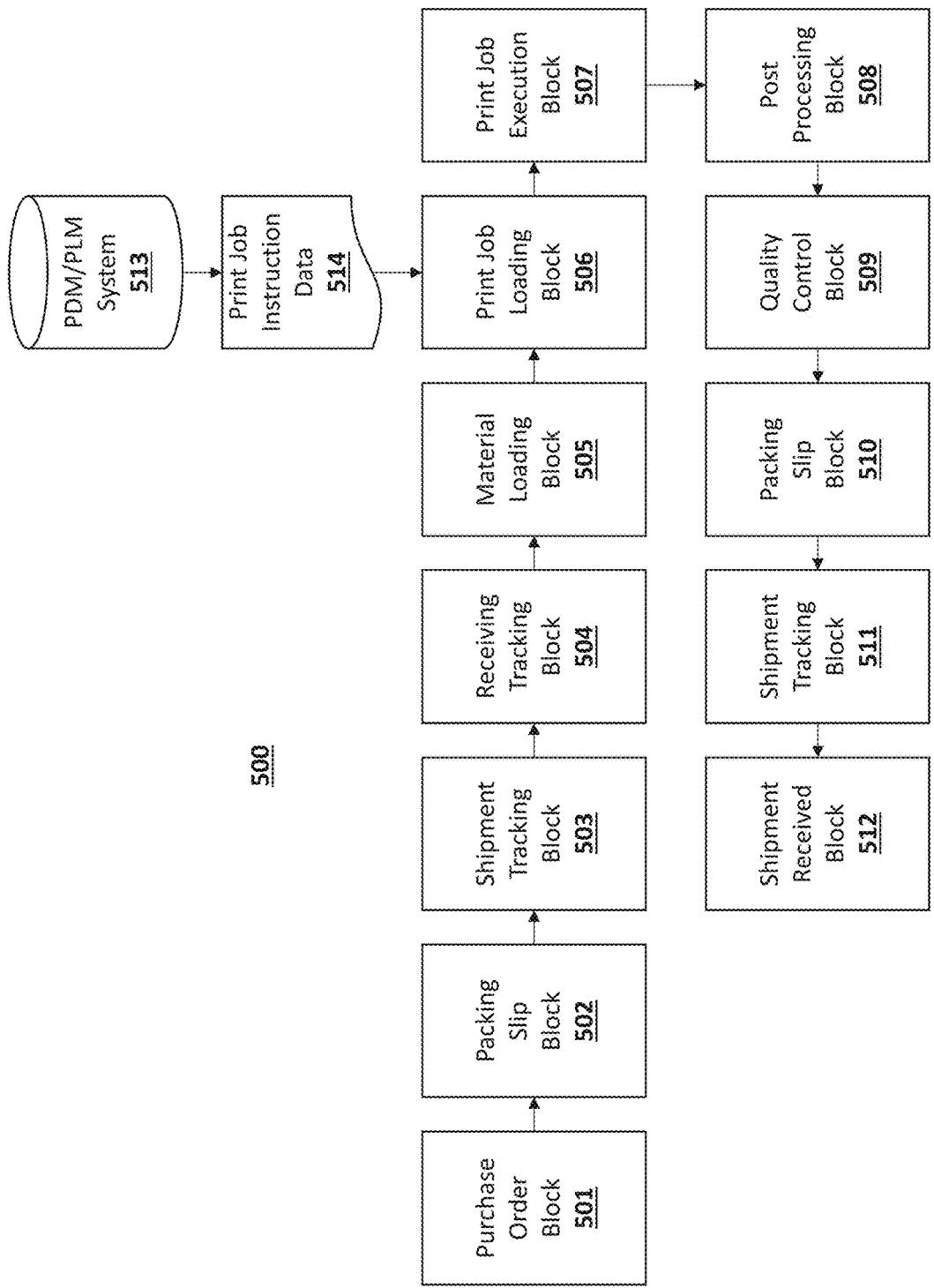
FIG. 5 illustrates a schematic diagram of embodiments.

The disclosed embodiments can provide a powerful traceability tool for many industries by tracking data at each step in a production process. FIG. 5 shows a block chain tracking system 500. A purchase order block 501 may, for example, be generated by an additive lab and may contain one or more of the following pieces of data: purchase order number(s) (PO #), part number(s), material number(s), quantities, and/or due date(s). A packing slip block 502 may be generated, for example, by a filament original equipment manufacturer (OEM) and may contain one or more of the following pieces of data: customer purchase order number(s), part number(s), material number(s), lot number(s), and/or tracking number(s). A shipment tracking block 503 may be generated, for example, by a shipper and may contain one or more of the following pieces of data: tracking number(s), scheduled pick-up date(s), and/or scan point(s). A receiving tracking block 504 may be generated, for example, by an additive lab and may contain one or more of the following pieces of data: part material(s), lot number(s), and/or date(s) received. A material loading block 505 may be generated, for example, by an additive lab and may contain one or more of the following pieces of data: printer identification(s) (ID's), material identification(s), spool identification(s), date(s) loaded, and/or operator identification(s). A print job loading block 506 may be generated, for example, by an additive lab and may contain one or more of the following pieces of data: printer identification(s), operator(s) identification, engineer(s) identification, date(s) loaded, and/or print job identification(s). A print job execution block 507 may be generated, for example, by an additive lab and may contain one or more of the following pieces of data: print job identification(s), job start timestamp(s), job end timestamp(s), and/or status(s). A post processing block 508 may be generated, for example, by an additive lab and may contain one or more of the following pieces of data: print job identification and/or status. A quality control block 509 may be generated, for example, by an additive lab and may contain one or more of the following pieces of data: print job identification(s) and/or status(s). A packing slip block 510 may be generated, for example, by an additive lab and may contain one or more of the following pieces of data: customer purchase order number(s), part number(s), material number(s), lot number(s), and/or tracking number(s). A shipment tracking block 511 may be generated, for example, by a shipper and may contain one or more of the following pieces of data: tracking number(s), scheduled pick up date(s), and/or scan point(s). A shipment received block 512 may be generated, for example, by a customer and may include one or more of the following pieces of data: tracking number(s), delivered date(s), and/or the name(s) of recipient(s).

Print job loading block 506 may receive data from a product data management/product lifecycle management (PDM/PLM) system 513. PDM/PLM system 513 may define machine, process, and/or material parameters to be used in a print. Print job instruction data 514 may include machine, process, and/or material parameters.

The blocks in block chain tracking system 500 may include any data that is be deemed to be a critical quality parameter. For example, blocks may include one or more of the following data that may be critical to quality (critical to quality parameters—CTQ's): temperature settings, measured temperature values, print settings, raw material type(s), raw material origin(s), raw material expiration date(s), operator name(s), starting and ending date(s) of each step, starting and ending time(s) of each step, cooling rates, heating rates, time a part spends in a tumbler, temperature of tumbler, speed (revolutions per minute) of a tumbler, machine types, cumulative time at each step, print settings, mechanical properties of raw materials, tools used at each step, and any other information that is deemed to be critical. By documenting and providing an accurate and comprehensive device history, the block chain tracking system 500 may be extremely useful for tracking and documenting critical parts (such as parts used in regulated industries), for example, parts that will be implanted into people's bodies or used in airplanes/aviation. The block chain tracking system 500 may be used to prevent counterfeit parts from being used by an end user and it may be used to prevent parts that do not meet specification from being used by an end user. The block chain tracking system 500 may be used in other manufacturing processes that include one or more of the following: injection molding processes, computer numerical control (CNC) machining processes, additive manufacturing processes, surface mount technology (SMT) processes, and other manufacturing processes.

Parts may be laser marked as they travel through a production process to ensure that the process was followed. In this way, an embodiment provides a digital traveler (a traveler is the paperwork that "travels" with a part as it moves through a production process).

The aforementioned embodiments provide a powerful tool for forensic analysis. For example, a doctor treating a patient with a painful hip implant (or other patient specific implant, facial implant, etc.) would be able to review the entire history of the hip implant (or other implant) to determine whether the hip implant (or other implant) may contain manufacturing defects that could be causing the patient's pain. The doctor would be able to trace the hip implant (or other implant) all the way back to the source of the metal that was used to produce the implant and would know which vendor supplied the metal, how the metal powder was stored, who loaded the metal onto a machine, how the metal was loaded, how long the metal was stored, whether proper production procedures were followed, etc. Other critical part applications, such as aviation and other regulated industries, would similarly benefit from the disclosed embodiments.

Moreover, it will be understood that the spool may be returned following usage, as referenced above. Alternatively, the memory tag, or identification, associated with the spool may be returned after complete exhaustion of the filament thereon, such as to allow for reuse of the memory tag or identification associated with the spool. The embodiments may be used for other consumables. In addition to the 3D principle discussed throughout. For example, ink print cartridges may be tracked in the same manner as discussed throughout, thereby preventing counterfeit or refilling of ink print cartridges with aftermarket ink.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A system to track use of a 3D print filament wound on a print spool for at least one printer in a plurality of additive manufacturing prints, comprising:
    a readable identifier associated with the print spool;
    a network connection between the at least one printer and at least one blockchain ledger comprising a plurality of blocks, the blockchain ledger comprising the readable identifier and a corresponding verification of the readable identifier and, solely for verified ones of the readable identifier, an in-ledger link to a data store comprising a plurality of parameters for the 3D print filament, records of prior ones of the plurality of additive manufacturing prints using the 3D print filament, and enhanced print algorithms for the 3D print filament, wherein each of the plurality of blocks comprise a respective cryptographic hash of a respective previous block to create a chain of the blockchain ledger;
    a confirmation data block at the data store of a sufficient amount of the print filament on the print spool to execute a plan for a current one of the plurality of manufacturing prints;
    a controller for executing the current one of the plurality of manufacturing prints, including the sufficient amount of the plurality of parameters for the current print and ones of the enhanced print algorithms for the current print, in accordance with the confirmation data block, wherein the sufficient amount is based on amounts of the print filament unused from the prior ones of the plurality of additive manufacturing prints based on the records from the data store; and
    an update block generator for generating an update block to the blockchain ledger confirming at least execution of the current one of the plurality of manufacturing prints by the at least one printer, and an update to the confirmation data block of the enhanced print algorithms and the amount of the print filament used in correspondence to the readable identifier, wherein the plurality of blocks comprises (i) the update block and (ii) a second update block appended to the update block by including the respective cryptographic hash of the update block;
    wherein the second update block comprises a second amount of the print filament less than the amount of the print filament unused from prior ones of the plurality of additive manufacturing prints, wherein the cryptographic hash of the second update block is used to certify, in conjunction with the controller, the second amount for use to ensure that the print filament was not respooled based on the second amount being less than the amount of the print filament unused from prior ones of the plurality of additive manufacturing prints.

2. The system of claim 1, wherein the blockchain ledger comprises a smart contract.

3. The system of claim 2, wherein the smart contract is used to update the update block.

4. The system of claim 1, wherein the blockchain ledger comprises peer-to-peer communication.

5. The system of claim 1, wherein the update block generates an update to a second confirmation data block, wherein the plurality of blocks are placed consecutively.

6. The system of claim 5, wherein the controller verifies that the second amount of the print filament is sufficient for a next print after the current print.

7. The system of claim 5, wherein the controller determines that the second amount of the print filament is not sufficient for a next print after the current print.

8. A system to track use of a 3D print filament wound on a print spool for at least one printer in a plurality of additive manufacturing prints, comprising:
    a readable identifier associated with the print spool;
    a network connection between the at least one printer and at least one blockchain ledger comprising a plurality of blocks, the blockchain ledger comprising the readable identifier and a corresponding verification of the readable identifier and, solely for verified ones of the readable identifier, an in-ledger link to a data store comprising a plurality of parameters for the 3D print filament, records of prior ones of the plurality of additive manufacturing prints using the 3D print filament, and enhanced print algorithms for the 3D print filament, wherein each of the plurality of blocks comprise a respective cryptographic hash of a respective previous block to create a chain of the blockchain ledger;
    a confirmation data block at the data store of a sufficient amount of the print filament on the print spool to execute a plan for a current one of the plurality of manufacturing prints;
    a controller for executing the current one of the plurality of manufacturing prints, including the sufficient amount of the plurality of parameters for the current print and ones of the enhanced print algorithms for the current print, in accordance with the confirmation data block, wherein the sufficient amount is based on amounts of the print filament unused from the prior ones of the plurality of additive manufacturing prints based on the records from the data store; and
    an update block generator for generating an update block to the blockchain ledger confirming at least execution of the current one of the plurality of manufacturing prints by the at least one printer, and an update to the confirmation data block of the enhanced print algorithms and the amount of the print filament used in correspondence to the readable identifier, wherein the plurality of blocks comprises (i) the update block and (ii) a second update block appended to the update block by including the respective cryptographic hash of the update block;
    wherein the second update block comprises a second amount of the print filament less than the amount of the print filament unused from prior ones of the plurality of additive manufacturing prints, wherein the cryptographic hash of the second update block certifies, in conjunction with the controller, the second amount, wherein the certification provided by the cryptographic hash of the second update block, in conjunction with the controller, ensures that the print filament was not respooled based on the second amount being less than the amount of the print filament unused from prior ones of the plurality of additive manufacturing prints, wherein the certification provided by the cryptographic hash of the second update block indicates that the print filament is expired.

9. The system of claim 1, wherein the data store is linked to the blockchain to determine whether the print spool is authorized based on a binary check.

10. The system of claim 1, wherein the data store is linked to the blockchain via the in-ledger link to determine whether the print spool is verified based on a binary check.

11. The system of claim 1, wherein the at least one printer is capable of automatically sensing characteristics of the print filament.

12. The system of claim 1, wherein the at least one printer is capable of receiving manual data entry associated with characteristics of the print filament.

13. The system of claim 1, wherein the at least one printer holds a public key corresponding to a private key of the blockchain.

\* \* \* \* \*